United States Patent
Schäfer

(10) Patent No.: US 12,152,649 B2
(45) Date of Patent: Nov. 26, 2024

(54) HYDRAULICALLY DAMPING ASSEMBLY BEARING

(71) Applicant: BOGE Elastmetall GmbH, Damme (DE)

(72) Inventor: Christof Schäfer, Sinzig (DE)

(73) Assignee: BOGE ELASTMETALL GMBH, Damme (DE)

( * ) Notice: Subject to any disclaimer, the term of this patent is extended or adjusted under 35 U.S.C. 154(b) by 382 days.

(21) Appl. No.: 17/614,615

(22) PCT Filed: May 24, 2020

(86) PCT No.: PCT/EP2020/064352
§ 371 (c)(1),
(2) Date: Nov. 29, 2021

(87) PCT Pub. No.: WO2020/239652
PCT Pub. Date: Dec. 3, 2020

(65) Prior Publication Data
US 2022/0228641 A1    Jul. 21, 2022

(30) Foreign Application Priority Data
May 28, 2019   (DE) .......................... 102019114363.2

(51) Int. Cl.
*F16F 13/10*   (2006.01)
*B60K 5/12*   (2006.01)

(52) U.S. Cl.
CPC .......... *F16F 13/106* (2013.01); *B60K 5/1225* (2013.01); *B60K 5/1233* (2013.01)

(58) Field of Classification Search
CPC ............................ F16F 13/105; F16F 13/106
See application file for complete search history.

(56) References Cited

U.S. PATENT DOCUMENTS

| | | | | |
|---|---|---|---|---|
| 4,352,487 A | * | 10/1982 | Shtarkman | F16F 13/26 267/140.13 |
| 5,340,093 A | * | 8/1994 | Rudolph | F16F 13/106 267/140.13 |

(Continued)

FOREIGN PATENT DOCUMENTS

| | | |
|---|---|---|
| DE | 102009003809 A1 | 10/2010 |
| DE | 102016120959 A1 | 5/2018 |

(Continued)

OTHER PUBLICATIONS

International Search Report dated Sep. 7, 2020; International Application No. PCT/EP2020/064352.

*Primary Examiner* — Bradley T King
(74) *Attorney, Agent, or Firm* — Dinsmore & Shohl LLP

(57) ABSTRACT

A hydraulically damping assembly bearing has two fluid-filled chambers which lie axially opposite each other and are hydraulically connected by a channel. A first chamber forms a working chamber enclosed by a bearing spring body and a second chamber forms a compensating chamber enclosed by a bellows. The compensating chamber has an axially extending inner wall encircling an interior. The bearing includes an annular body axially between the working and compensating chambers, enclosing an axial throughopening opening into the working chamber and closed by a membrane integrally formed with the inner wall of the bellows. The membrane has a central region defined by the inner wall and together with the inner wall delimits the interior. The membrane has a collar region encircling the central region and integrally formed with the central region. The outer circumference of the collar is rigidly connected to the annular body and/or the spring body.

13 Claims, 5 Drawing Sheets

(56) References Cited

U.S. PATENT DOCUMENTS

| | | | |
|---|---|---|---|
| 5,340,094 A | 8/1994 | Schyboll et al. | |
| 5,628,498 A * | 5/1997 | Nanno | F16F 13/10 267/140.13 |
| 2001/0010413 A1 * | 8/2001 | Takashima | F16F 13/26 267/140.13 |
| 2002/0105122 A1 * | 8/2002 | Shores | F16F 13/262 267/140.11 |
| 2009/0008845 A1 * | 1/2009 | Tanaka | F16F 13/268 267/140.13 |
| 2018/0045266 A1 * | 2/2018 | Schemer | F16F 13/106 |
| 2018/0320754 A1 * | 11/2018 | Takakura | F16F 13/105 |
| 2020/0109759 A1 * | 4/2020 | Beckmann | F16F 13/105 |
| 2021/0033166 A1 * | 2/2021 | Holz | F16F 13/266 |
| 2021/0061379 A1 * | 3/2021 | Oblizajek | B60K 5/1283 |

FOREIGN PATENT DOCUMENTS

| | | |
|---|---|---|
| EP | 0527302 A1 | 2/1993 |
| EP | 0565860 A1 | 10/1993 |
| EP | 3290739 A1 | 3/2018 |

* cited by examiner

HYDRAULICALLY DAMPING ASSEMBLY BEARING

CROSS-REFERENCE TO RELATED APPLICATIONS

This application is the U.S. National Stage of PCT/EP2020/064352 filed May 24, 2020, which claims priority to German Patent Application No. 10 2019 114 363.2, filed May 28, 2019, the contents of each of which are incorporated herein by reference in their entirety.

FIELD OF THE INVENTION

The invention relates to a hydraulically damping assembly bearing having two chambers that are disposed opposite one another in an axial direction, that are filled with fluid, and that are hydraulically connected to one another by at least one channel, of which a first chamber forms a working chamber surrounded by a bearing spring member and a second chamber forms a balance chamber surrounded by a bellows that has an inner wall encompassing an inner space and extending in the axial direction and having an annular member that is arranged between the working chamber and the balance chamber in the axial direction and that surrounds an axial passage aperture that opens into the working chamber and that is closed by a membrane that is formed in one part with the inner wall of the bellows and that has a central region that is defined and/or bounded by the inner wall and that bounds the inner space together with the inner wall.

BACKGROUND OF THE INVENTION

DE 10 2016 120 959 A1 discloses a hydraulically damping bearing for supporting a motor vehicle unit, in particular for supporting a motor vehicle engine at a motor vehicle body, having a supporting spring that supports a bearing core and surrounds a working chamber and having a balance chamber that is separated from the working chamber by a partition wall and is bounded by a balance membrane. The balance chamber and the working chamber are filled with a fluid and are connected to one another via a damping channel introduced into the partition wall, wherein the partition wall has a membrane that is received in a vibration-capable manner and with which a foam element is associated that supports the membrane on a deflection. It is a disadvantage with this bearing that additional components such as the foam element and a holder for the foam element are required to achieve the desired dynamic stiffnesses. This not only increases the number of parts and thus the effort for producing these parts, but also the number of assembly steps.

SUMMARY OF THE INVENTION

Starting from this, it is the underlying object of the invention to be able to achieve desired stiffnesses in a hydraulically damping assembly bearing with as few additional components as possible.

This object is achieved in accordance with the invention by a hydraulically damping assembly bearing as disclosed herein. Preferred further developments of the invention are also disclosed in the following description.

The initially named hydraulically damping assembly bearing having two chambers that are disposed opposite one another in an axial direction, that are filled with fluid, and that are hydraulically connected to one another by at least one channel, of which a first chamber forms a working chamber surrounded by a bearing spring member and a second chamber forms a balance chamber surrounded by a bellows that has an inner wall encompassing an inner space. The inner wall extends in the axial direction. The assembly also has an annular member that is arranged between the working chamber and the balance chamber in the axial direction and that surrounds an axial passage aperture that opens into the working chamber. The axial aperture is closed by a membrane that is formed in one part with the inner wall of the bellows. The membrane has a central region that is defined and/or bounded by the inner wall and bounds the inner space together with the inner wall and is in particular further developed in accordance with the invention in that the membrane has a collar region encompassing a central region and is formed in one part therewith that is fixedly connected at its outer periphery to the ring member and/or to the bearing spring member.

It is possible by the collar region, in particular in combination with the singe-part configuration of the membrane and the inner wall and/or bellows to influence the stiffness behavior, that is preferably dynamic and/or static, of the hydraulically damping assembly bearing. It is possible, for example, to achieve a self-regulating function, which can conventionally only be achieved by the use of an active device influencing the vibration behavior of the membrane. It is, however, preferably possible also to provide an active device influencing the vibration behavior of the membrane such as an actuator or a switching device that is e.g. arranged in the inner space for the hydraulically damping assembly bearing in accordance with the invention.

An axial center axis is preferably associated with the hydraulically damping assembly bearing. An axial center axis is preferably associated with the inner space. The axial center axis of the inner space is preferably coextensive with the axial center axis of the hydraulically damping assembly bearing. The axial center axis of the inner space and the axial center axis of the hydraulically damping assembly bearing are preferably thus in particular also called a center axis. One or each direction extending transversely to the axial direction and/or to the center axis is in particular designated as the radial direction.

The membrane is preferably elastic and/or flexible. The central region is preferably elastic and/or flexible. The collar region is advantageously elastic and/or flexible The membrane is in particular formed in one part with the bellows. The inner wall is preferably elastic and/or flexible. The bellows is advantageously elastic and/or flexible.

In accordance with an aspect, the inner wall has at least one bulge, preferably in the axial direction, advantageously extending about the axial center axis of the inner space. The at least one bulge is preferably at least one radial bulge and/or is formed by at least one, in particular regional, enlargement of the diameter of the inner space. The inner wall is preferably arched, in particular radially into the balance chamber and/or is arched out of the inner space in the region of the at least one bulge.

In accordance with a further development, the inner wall has at least one dimple, preferably in the axial direction, advantageously extending about the axial center axis of the inner space that preferably adjoins the bulge, in particular axially. It is in particular possible by the at least one dimple, e.g. by its positioning and/or geometrical embodiment, to influence, in particular additionally, the, preferably dynamic and/or static, stiffness behavior of the hydraulically damping assembly bearing. The at least one dimple is preferably at least one radial dimple and/or is formed by at least one, in particular regional, enlargement of the diameter of the inner space. The inner wall is preferably arched, in particular radially into the balance chamber and/or is arched out of the inner space in the region of the at least one dimple. The at least one bulge and the at least one dimple are advantageously arched, in particular in the radial direction, in mutually opposite directions. The at least one dimple e.g. forms one or at least one waist and/or restriction. The at least one bulge and the at least one dimple preferably merge into one another, in particular in the axial direction. The inner wall preferably extends in a wave-like manner in the axial direction.

In accordance with an embodiment, the collar region adjoins the central region, in particular radially and/or directly. The collar region preferably extends, in particular radially, beyond the inner wall and/or beyond a connection region in which the inner wall is connected to the central region and/or to the membrane. The inner wall preferably engages at the transition between the central region and the collar region and/or in the connection region at the membrane, in particular on a side of the membrane remote from the working chamber and/or the annular member and/or the passage aperture. The collar region advantageously encompasses the center axis. The bellows comprises the collar region, for example. The collar region is in particular formed in one part with the bellows. The membrane is preferably fixedly connected at its outer periphery to the annular member and/or to the bearing spring member. The outer periphery of the collar region preferably forms the outer periphery of the membrane. The collar region and/or the membrane is/are advantageously fixedly connected to the annular member and/or to the bearing spring member exclusively or only at the outer periphery/peripheries. The membrane is preferably fixedly connected to the annular member and/or to the bearing spring member, in particular exclusively or only, in that the collar region is fixedly connected at its outer periphery to the annular member and/or to the bearing spring member. The membrane and/or the collar region is/are preferably fastened or fixed, in particular exclusively or only, to the annular member and/or to the bearing spring member at or to the outer periphery/peripheries. The membrane is advantageously fixedly connected to the annular member and/or to the bearing spring member and/or is fastened of fixed to the annular member and/or the bearing spring member, in particular exclusively or only, in that the collar region is fastened or fixed at its outer periphery to the annular member and/or to the bearing spring member. The collar region is preferably fastened or fixed to the annular member and/or to the bearing spring member at a preferably radial spacing from the central region. The central region preferably merges into the collar region, in particular in a radial direction, preferably with material continuity. The collar region advantageously expands the central region, in particular in the radial direction. The central region and the collar region preferably together form the membrane. The central region preferably forms a part of the membrane, in particular a radially inner or central part. The membrane is preferably formed in one part with the bellows. The central region and/or the collar region and/or the membrane is/are in particular capable of vibration and/or movable and/or elastically movable, preferably at a radial spacing from the outer periphery of the collar region or of the membrane and/or in the axial direction, relative to or oppositely disposed to the annular member and/or the bearing spring member. The collar region is advantageously connected at its outer periphery and/or the membrane is advantageously connected at its outer periphery to the annular member and/or to the bearing spring member and/or is fastened or fixed to the annular member and/or to the bearing spring member such that the central region and/or the collar region and/or the membrane is/are capable of vibration and/or movable and/or elastically movable, preferably at a radial spacing from the outer periphery of the collar region or of the membrane and/or in the axial direction, relative to or oppositely disposed to the annular member and/or the bearing spring member. The central region and/or the membrane is/are, for example, arranged in the passage aperture. The central region and/or the collar region and/or the membrane is/are preferably arranged at a side of the passage aperture remote from the working chamber. The central region and/or the collar region and/or the membrane is/are preferably of disk shape. The collar region is, for example, annular or of annular disk shape. The central region and/or the collar region and/or the membrane preferably has/have, preferably respectively, a circular outer peripheral contour. The collar region advantageously has a circular inner peripheral contour. The central region and/or the collar region and/or the membrane is/are preferably axially supported or supportable at the annular member on the side facing the working chamber, preferably at a radial spacing from the outer periphery of the collar region and/or of the membrane. The central region and/or the collar region and/or the membrane is/are preferably not axially supported or supportable at the annular member on the side facing the working chamber, preferably at a radial spacing from the outer periphery of the collar region and/or of the membrane. The central region and/or the collar region and/or the membrane is/are in particular movable away from the annular member and/or movable relative to the annular body and/or vibration-capable, preferably in the axial direction, advantageously on the side of the annular member remote from the working chamber, preferably at a, preferably radial, spacing from the outer periphery of the collar region and/or of the membrane. The membrane and/or the collar region and/or the central region can advantageously rise from the annular member, advantageously in the axial direction, in particular thus, preferably at a, preferably radial, spacing from the outer periphery of the collar region.

The two chambers are preferably separated from one another by the annular member and/or by the central region and/or by the collar region and/or by the membrane.

In accordance with a further development, the inner wall is rotationally symmetrical with respect to the center axis. The inner space is preferably rotationally symmetrical with respect to the center axis. The bearing spring member and/or the working chamber and/or the central region and/or the collar region and/or the membrane and/or the bellows and/or the balance chamber and/or the annular member and/or the passage aperture is/are in particular, preferably respectively, rotationally symmetrical with respect to the center axis. The channel advantageously extends at least regionally or completely or at least once or multiple times about the center axis.

In accordance with an embodiment, the membrane preferably has at least one stiffening element, preferably in the central region, that in particular increases the stiffness of the membrane and that is arranged, for example, on a side of the membrane and/or of the central region facing the inner space and/or in the inner space. The membrane preferably has a plurality of stiffening elements, preferably in the central region, that in particular increase the stiffness of the membrane and that are arranged, for example, on a side of the membrane and/or of the central region facing the inner space and/or in the inner space. It is in particular possible by the stiffening element or stiffening elements, e.g. by the positioning and/or geometrical embodiment of each stiffening element or stiffening elements, to influence, in particular additionally, the preferably dynamic and/or static stiffness behavior of the hydraulically damping assembly bearing. Each stiffening element is e.g. fixedly connected and/or connected with material continuity to the bellows and/or to the central region and/or to the membrane and/or is formed in one part with the bellows and/or with the central region and/or with the membrane. Each stiffening element is preferably arranged at a spacing from the center axis, in particular in the radial direction. Each stiffening element preferably extends in the axial direction. Each stiffening element extends, for example, away from the membrane, in particular starting from the membrane. Each stiffening element is advantageously, in particular at least regionally, arched in the direction toward the inner wall. Sharp edges can thus e.g. be avoided that could result in damage to the inner wall on a contact of the inner wall and the stiffening element. Each stiffening element preferably extends, in particular axially, from the central region and/or from the membrane, into the inner space. The stiffening elements are e.g. arranged around the center axis, in particular at a spacing from one another. Each stiffening element preferably comprises the material of the membrane and/or of the central region and/or of the bellows. Each stiffening element comprises elastomer, for example. Each stiffening element is advantageously formed in the shape of a rib and is also e.g. called a stiffening rib.

The membrane preferably has at least one additional mass element, preferably in the central region, that is arranged, for example, on a side of the membrane and/or of the central region facing the inner space and/or in the inner space. The vibration behavior of the membrane is e.g. influenceable by the additional mass element.

In accordance with a further development, the inner space is open to the environment, in particular on its side remote from the central region and/or the membrane. The central region and/or the part of the membrane forming the central region is/are preferably, in particular thus, at atmospheric pressure at the side(s) facing the inner space. A small dynamic stiffness and/or a higher permanent strength of the hydraulically damping assembly bearing is or are hereby achievable. In accordance with an alternative, the inner space is e.g. closed, in particular toward the environment. The inner space, for example, forms a closed space. The inner space has e.g. a pressure differing from the environment. A fluid is, for example, introduced into the inner space.

The inner space is e.g. connected to the environment by a nozzle. On a slow or low-frequency movement of the membrane, the nozzle e.g. permits an exchange of air between the inner space and the environment. On a fast or high-frequency movement of the membrane, an exchange of air between the inner space and the environment is e.g. blocked by the nozzle. The inner space preferably forms a free space.

In accordance with an embodiment, the annular member has two or at least two annular member pats that are arranged axially above one another and that are in particular of ring shape. The collar region and/or the membrane is/are preferably fastened and/or fixed and/or clamped between the annular member parts at the outer periphery. It is thus possible in a simple manner to fasten and/or to fix the collar region and/or the membrane to the annular member. The annular member and/or each annular member part in particular forms/form a member of stable shape. The annular member and/or each annular member part comprises plastic, for example. The annular member is alternatively e.g. formed in one part.

In accordance with a further development, the annular member has, at a side remote from the working chamber, an aperture, preferably a circular or oval aperture, and/or a bore and/or a recess into which the passage aperture in particular opens, preferably centrally or radially centrally, that in particular has a smaller diameter and/or smaller dimensions than the aperture and/or the bore and/or the recess in which the membrane and/or the collar region having the central region is/are enclosed. The membrane and/or the collar region and/or the central region can preferably, in particular thus, rise from the annular member, preferably in the axial direction. It is e.g. possible by this rising of the membrane and/or of the collar region and/or of the central region from the annular member to deform the inner wall and/or the arching and/or the dimple, in particular elastically, and thus to influence, in particular additionally, the preferably dynamic and/or static stiffness behavior of the hydraulically damping assembly bearing. The aperture and/or bore and/or recess, that is/are in particular circular, is/are preferably provided in or at least in an annular member part of the annular member parts remote from the working chamber.

In accordance with an embodiment, the channel is provided in the annular member. The channel surrounds the center axis, preferably at least regionally or completely or at least once or multiple times. The channel is preferably enclosed between the annular member parts. The channel advantageously has at least one aperture both toward the working chamber and the balance chamber. The channel is e.g. also called a damping channel. The channel is preferably bounded by the annular member parts. The channel is radially inwardly e.g. bounded and/or sealed by at least one of the annular member parts or by the membrane.

In accordance with a further development, the bearing spring member has an elastomeric bearing spring and two connector parts, preferably of stable shape, that are fixedly connected thereto and/or are connected thereto with material continuity and between which the bearing spring extends, in particular in the axial direction. A first one of the connector parts is preferably provided, in particular radially, centrally at the elastomeric bearing spring and/or at an end of the bearing spring remote from the balance chamber and/or from the annular member. The first connector part is e.g. also called a bearing core. A second one of the connector parts is preferably provided at the outer periphery of the bearing spring and/or at an end of the bearing spring remote from the balance chamber and/or from the annular member. The second connector part is in particular of annular shape. The second connector part is formed by the annular member, for example. The second connector part is preferably a separate component, however. The connector parts are preferably arranged offset from one another in the axial direction. The collar region is, for example, fixedly connected to one of the connector parts and/or to the second connector part.

In accordance with an embodiment, the hydraulically damping assembly bearing comprises a housing in which in particular the bearing spring member and/or the annular member is/are arranged. The second connector part is formed by the housing, for example. The second connector part and/or the annular member is/are preferably fastened, in particular at least indirectly, to the housing.

The working chamber is preferably bounded by the bearing spring member. The working chamber is preferably, in particular additionally, bounded by the annular member and/or by the membrane.

The balance chamber is preferably bounded by the bellows. The balance chamber is preferably, in particular additionally, bounded by the annular member and/or by the membrane and/or by the collar region. The balance chamber is advantageously annular.

The bellows preferably has an outer wall and a base, in particular an annular base, that is preferably provided on a side of the bellows remote from the working chamber and/or the annular member. The outer wall advantageously encompasses the inner wall. The base preferably connects the inner wall to the outer wall. The balance chamber is preferably enclosed between the inner wall of the outer wall. The balance chamber is advantageously, in particular additionally, bounded by the outer wall and/or by the base. The balance chamber is preferably, in particular additionally, bounded by the annular member and/or by the membrane and/or by the central region and/or by the collar region.

The bellows is preferably covered by a bellows cover, e.g. on a side remote from the balance chamber and/or the annular member. The bellows is preferably axially supported or supportable at the bellows cover, in particular by its base, e.g. on a side that is remote from the balance chamber and/or the annular member. The base is preferably movable relative to the bellow s cover, preferably in the axial direction. The base and/or the inner wall and/or the bellows is/are in particular not fixed to the bellows cover. Alternatively, the base and/or the inner wall and/or the bellows is/are e.g. fixed to the bellows cover. The bellows cover is, for example, fastened to the annular member and/or to the second connector part, and/or the housing, in particular directly or at least indirectly. The annular body is preferably arranged and/or fixed between the second connector part and the bellows cover, in particular in the axial direction. The bellows cover is preferably fastened or fastenable to the second connector part, for example with shape matching and/or by a snap-in connection. The snap-in connection serves e.g. as an installation aid. The outer wall of the bellows is in particular fixed and/or clamped between the bellows cover and the annular member at an end facing the working chamber and/or the annular member. The bellows cover preferably has at least one or a plurality of continuous holes. A pressure balance between the interior of the bellows cover and the environment is thus e.g. possible when the volume of the bellows changes due to fluid flowing in or out of it. It can furthermore thus in particular be ensured that the inner space is at atmospheric pressure.

The inner wall is preferably connected fixedly or with material continuity to the membrane and/or to the central region and/or to the collar region and/or to the bellows. The inner wall is preferably arranged on a side of the membrane and/or of the central region and/or of the collar region remote from the passage aperture and/or from the working chamber. The inner wall advantageously merges into the central region and/or into the collar region and/or into the membrane, in particular on the side of the membrane and/or of the central region and/or of the collar region remote from the passage aperture and/or from the annular member and/or from the working chamber, preferably at the outer periphery of the central region and/or at the inner periphery of the collar region. The inner wall, for example, merges into the membrane and/or into the central region and/or into the collar region, in particular on the side of the membrane and/or of the central region and/or of the collar remote from the passage aperture and/or from the annular member and/or from the working chamber, at the transition between the central region and the collar region. The membrane and/or the central region and/or the inner wall and/or the collar region and/or the outer wall and/or the base and/or the stiffening element or elements is or are in particular formed in one part and/or with material homogeneity with one another and/or with the bellows. It is thus possible to produce the bellows together with the membrane and/or with the central region and/or with the inner wall and/or with the collar region and/or with the outer wall and/or with the base and/or with the stiffening element or elements in one production step. The bellows and/or the membrane and/or the central region and/or the inner wall and/or the collar region and/or the outer wall and/or the base and/or the stiffening element or elements preferably consist of an elastomer.

The hydraulically damping assembly bearing is in particular provided for a vehicle that is preferably a motor vehicle. The hydraulically damping assembly bearing preferably serves the support and/or fastening of a vehicle engine or vehicle transmission to a vehicle body.

BRIEF DESCRIPTION OF THE DRAWINGS

The invention will be described in the following with reference to a preferred embodiment and to the drawing. There are shown in the drawing.

DETAILED DESCRIPTION OF THE INVENTION

Figure 1:
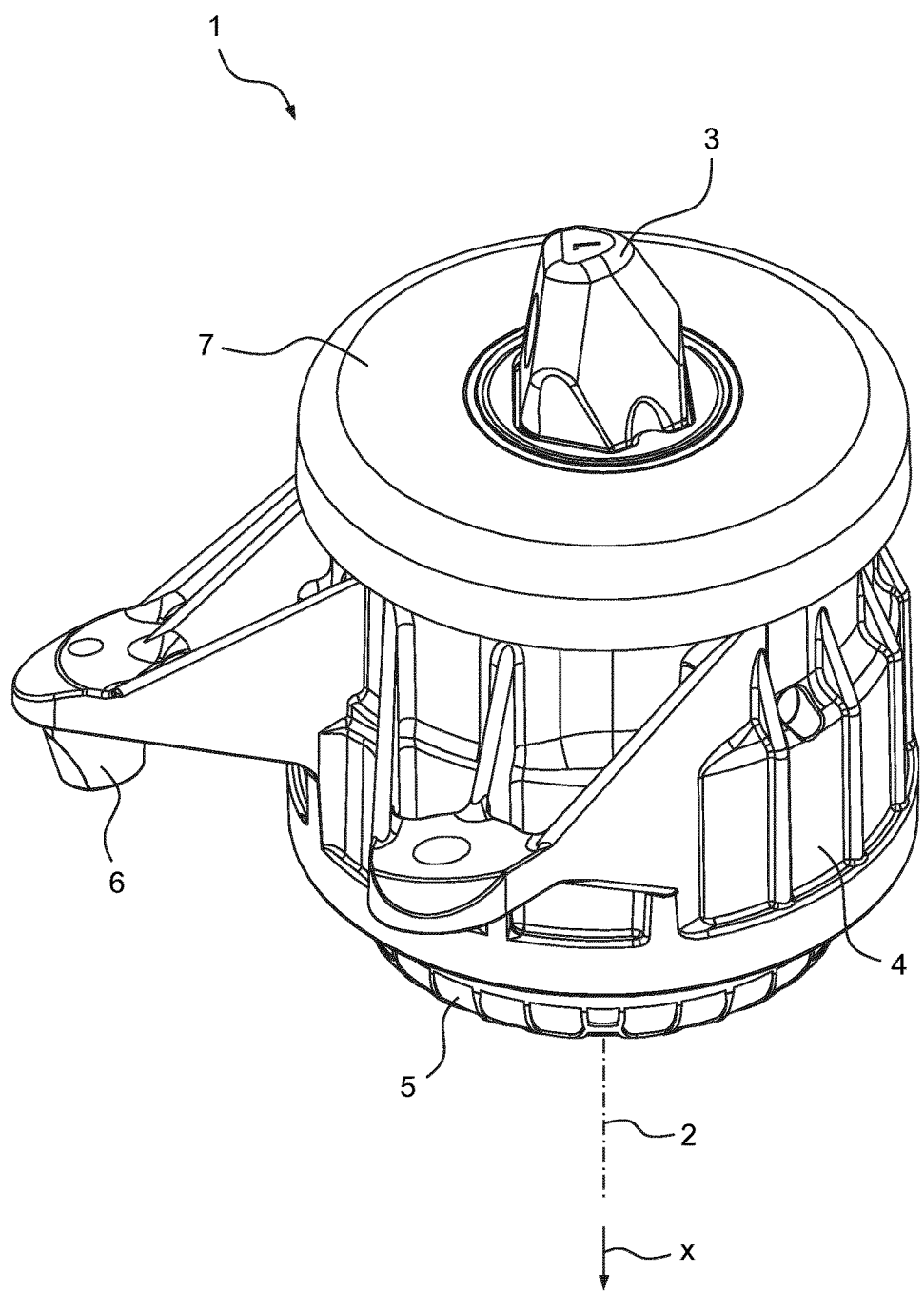
FIG. 1 is a perspective view of a hydraulically damping assembly bearing in accordance with an embodiment.
Figure 2:
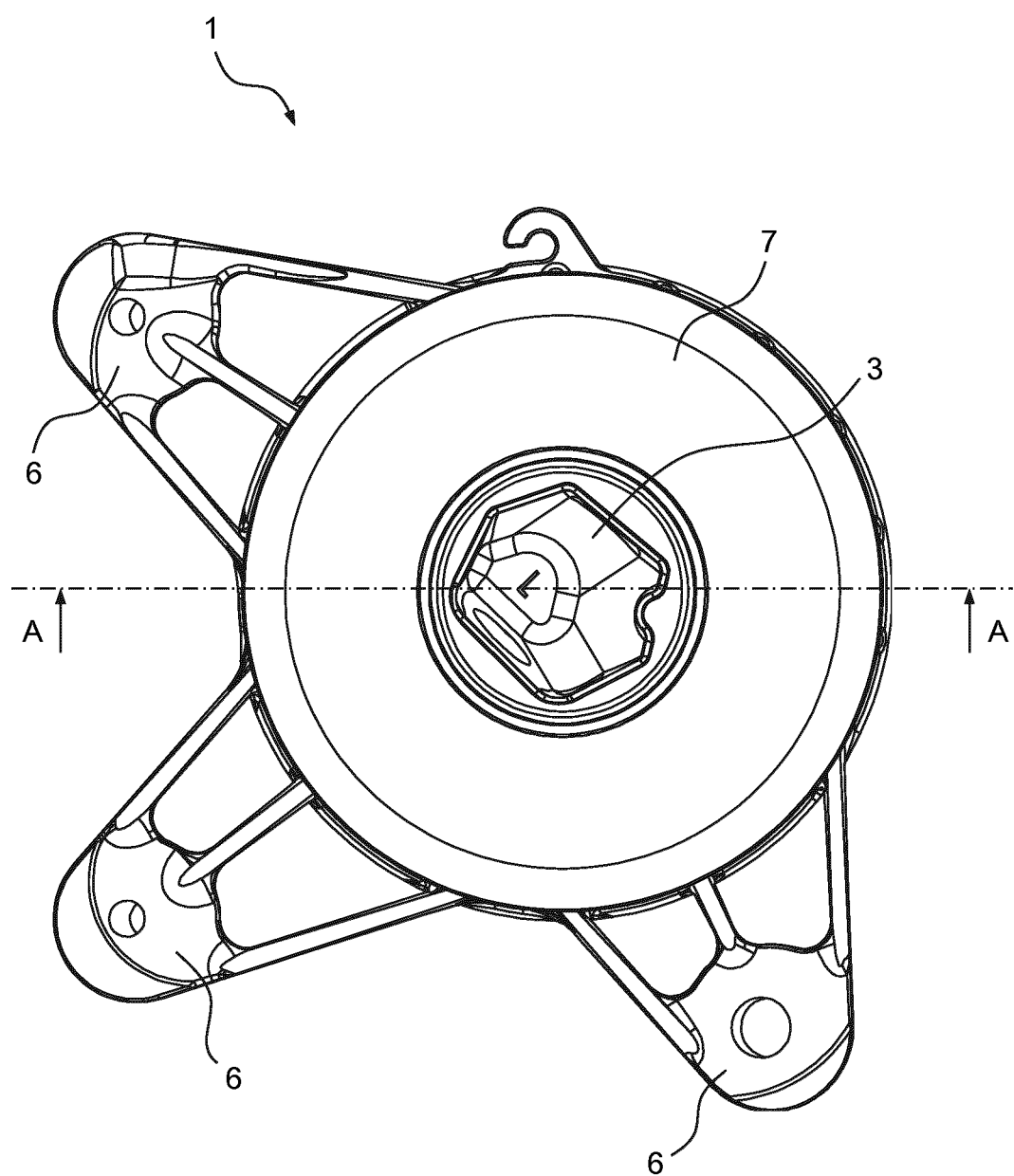
FIG. 2 is a plan view of the hydraulically damping assembly bearing in accordance with FIG. 1.
Figure 3:
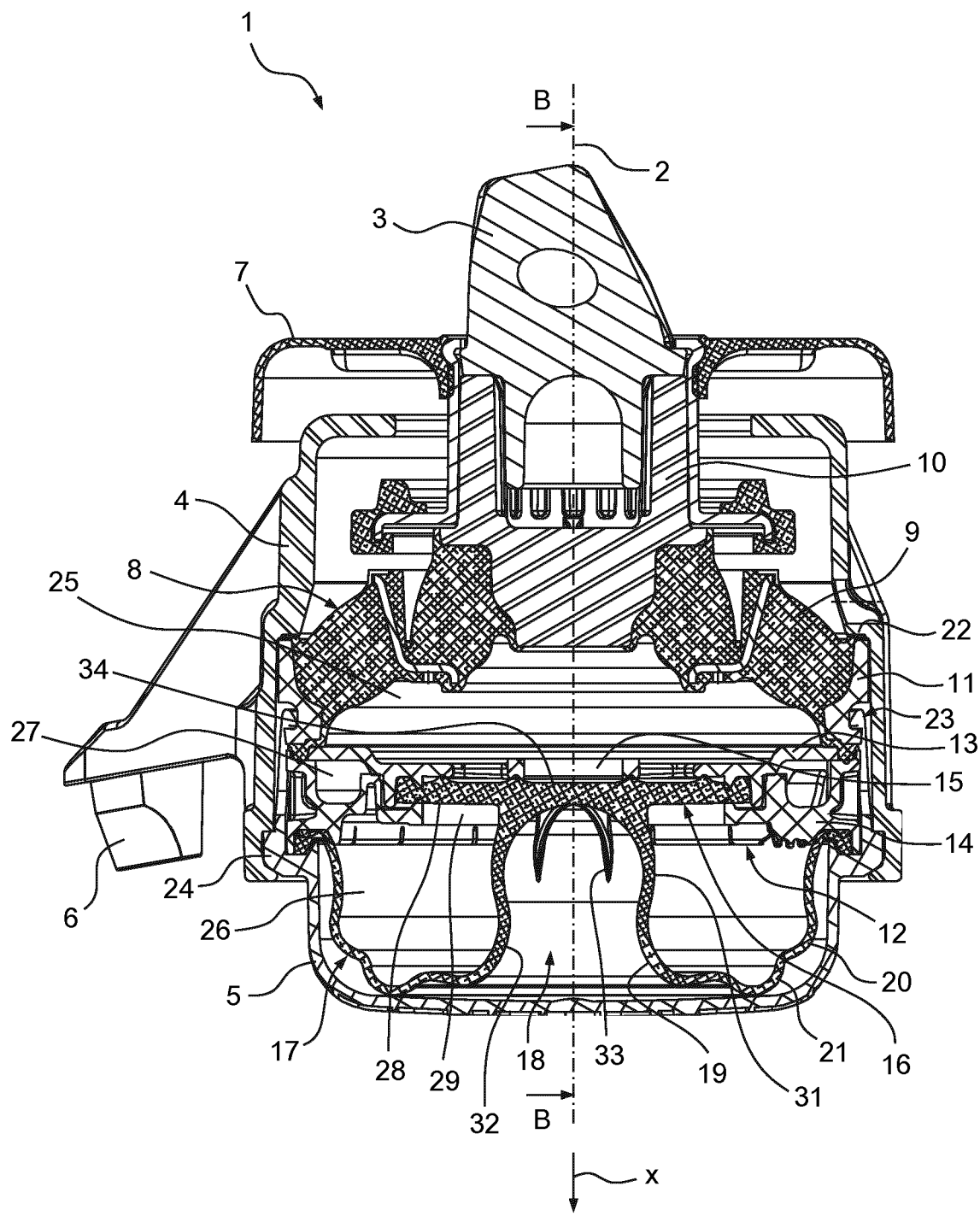
FIG. 3 is a longitudinal section through the hydraulically damping assembly bearing along the line A-A visible from FIG. 2.
Figure 4:
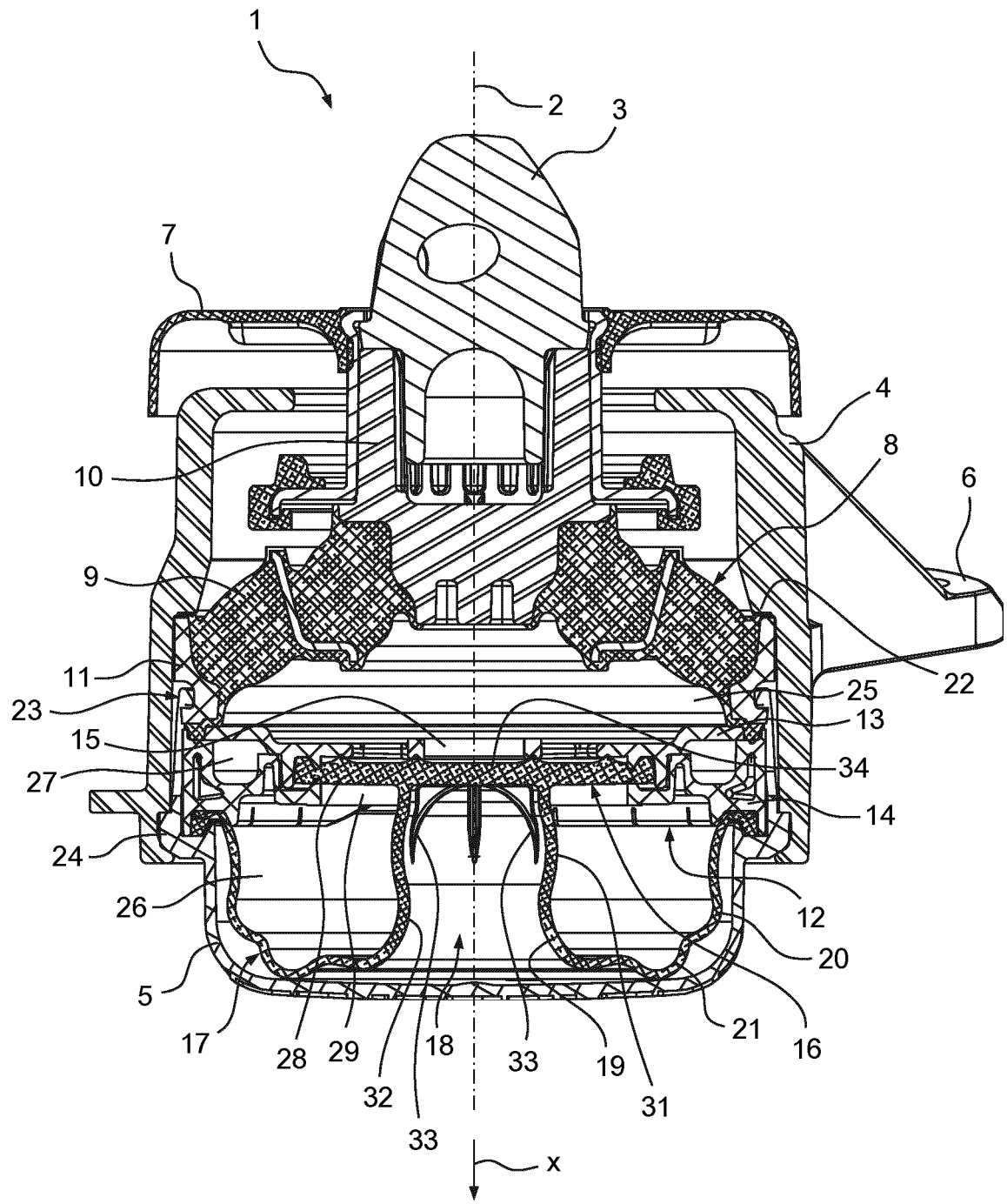
FIG. 4 is a different longitudinal section through the hydraulically damping assembly bearing along the line B-B visible from FIG. 3.
Figure 5:
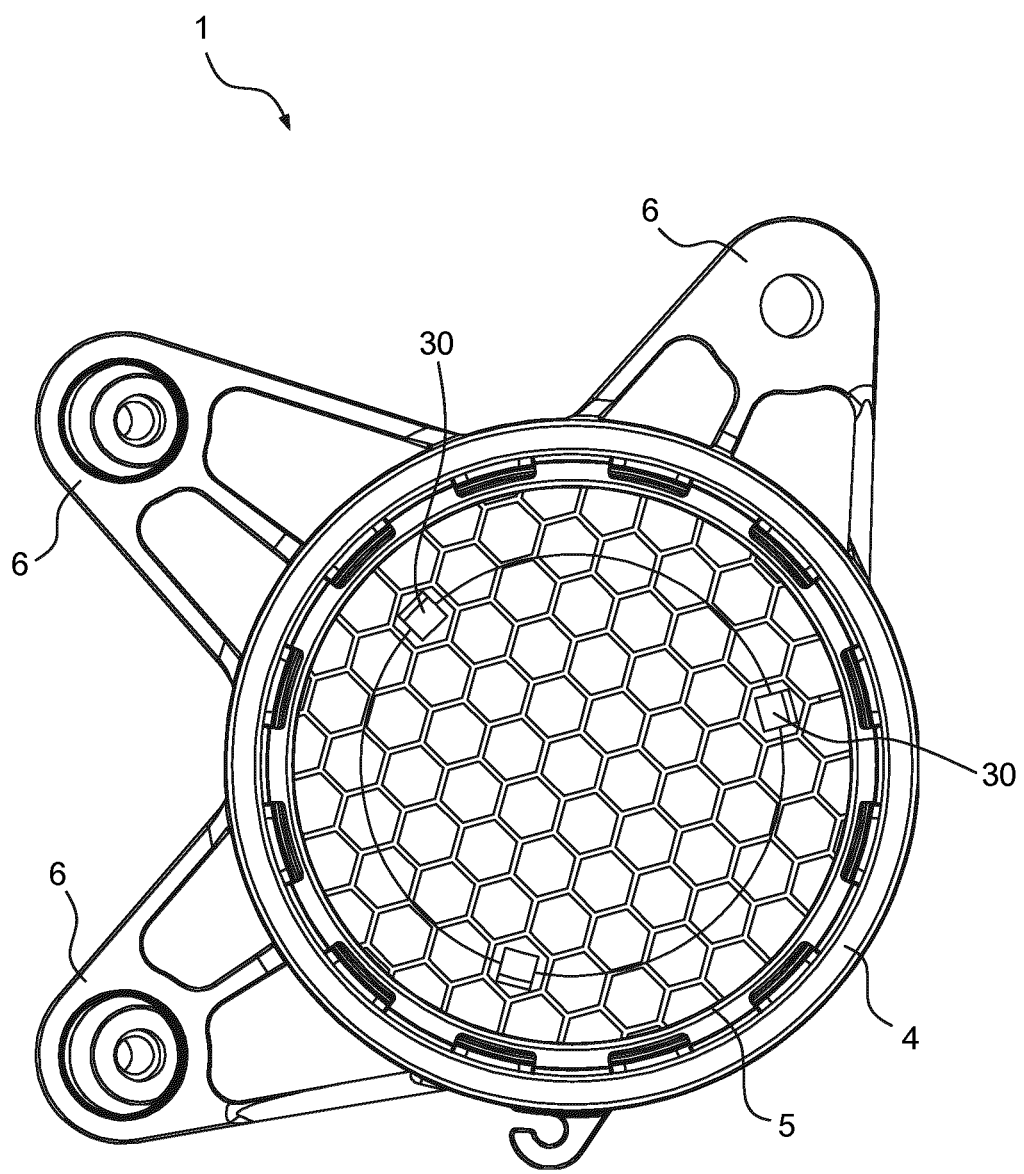
FIG. 5 is a bottom view of the hydraulically damping assembly bearing in accordance with FIG. 1.

Different views of a hydraulically damping assembly bearing 1 in accordance with an embodiment can be seen from FIGS. 1 to 5, with a center axis 2 extending in an axial direction x being associated therewith. The hydraulically damping assembly bearing 1 has a central installation element 3 and a housing 4 that is closed at the front face on a side remote from the central installation element 3 by a bellows cover 5 in which a plurality of holes 30 are provided. Additional installation elements 6 are furthermore provided at the housing 4. A cap 7 encompassing the central installation element 3 is also fastened thereto.

A bearing spring member 8 is arranged in the housing 4 and has an elastomeric bearing spring 9 and two connector parts 10 and 11 connected thereto between which the bearing spring 9 extends in the axial direction x. The central installation element 3 is fastened to a first one of the connector parts 10 that extends, in particular axially, from the housing 4. In accordance with a possible alternative, the first connector unit 10 is formed, e.g. in one piece, with the central installation element 3. A second one of the connector parts 11 radially contacts an inner peripheral wall of the housing 4 and axially at a radial inner shoulder 22 of the housing 4 so that the bearing spring member 8 is connected to the housing 4 by the second connector part 11. An annular member 12 is arranged between the bearing spring member 8 and the bellows cover 5 in the axial direction x and is composed of two ring-shaped annular member parts 13 and 14 arranged axially above one another. The annular member 12 surrounds an axial passage aperture 15 that is closed by a membrane 16.

The bellows cover 5 is in particular secured at the second connector part 11, in particular in the pre-installed state, by a snap-in connection 23. The annular member 12 is furthermore fixed between the second connector part 11 and a margin 24 of the bellows cover 5 that faces the annular member 12 and that is in turn fixed to the housing 4.

A bellows 17 is provided at a side of the annular member 12 remote from the bearing spring member 8, said bellows 17 having an inner wall 19 encompassing an inner space 18, an outer wall 20 encompassing it, and a base 21 that connects the inner wall 19 to the outer wall 20 and by which the bellows 17 is supported, in particular axially, at the bellows cover 5. The end of the outer wall 20 remote from the base 21 is fixed between the annular member 12 and the bellows cover 5.

The bearing spring member 8 surrounds a working chamber 24 into which the passage aperture 15 opens. The bellows 17 furthermore surrounds an annular balance chamber 26 that is separated from the working chamber 25 by the annular member 12 and the membrane 16. The chambers 25 and 26 are filled with a fluid and are hydraulically connected to one another by a channel 27 extending in the annular member 12.

The membrane 16 comprises a central region 34 and a collar region 28 that encompasses it and adjoins it and that is fixed at its outer periphery between the annular member parts 13 and 14 at the annular body 12. The membrane 16 and the inner wall 19 are formed in one part with one another. The central region 34 and the collar region 28 are furthermore formed in one part with one another and in one part with the bellows 17, with the end of the inner wall 19 of said bellows 17 facing the membrane 16 being connected to the membrane 16 at the transition between the central region 34 and the collar region 28. The central region 34 and the collar region 28 together form the membrane 16 that in particular forms a disk-shaped member.

At its side remote from the working chamber 25, the annular member 12 has a recess 29 that is preferably circular and into which the passage aperture 15 opens, preferably centrally, that in particular has a smaller diameter than the recess 29 in which the membrane 16 is disposed. The membrane 16 together with the inner wall 19 bounds the inner space 18 that is open to the environment at its side remote from the membrane 16. The center axis 2 also forms a center axis of the inner space 18.

The inner wall 19 has a bulge 31 extending about the center axis 2 in the axial direction x and a dimple 32 that adjoins it and extends about the center axis 2. Stiffening elements 33 are furthermore provided in the form of ribs that extend axially from the central region 24 of the membrane 16 into the inner space 18.

The invention claimed is:

1. A hydraulically damping assembly bearing, comprising:
   a housing;
   a working chamber defined in the housing;
   a balance chamber defined in the housing opposite the working chamber in an axial direction (x);
   the working chamber and the balance chamber filled with a fluid and hydraulically connected to one another by at least one channel;
   a bearing spring member surrounding the working chamber;
   a bellows surrounding the balance chamber;
   an inner wall of the bellows extending in the axial direction (x), the inner wall encompassing an inner space;
   an annular member arranged between the working chamber and the balance chamber in the axial direction (x);
   an axial passage aperture defined by the annular member, the axial passage aperture opening into the working chamber;
   a membrane configured to close the axial passage aperture, the membrane being formed in one part with the inner wall of the bellows;
   the membrane having a central region defined and/or bounded by the inner wall, the central region bounding the inner space together with the inner wall,
   wherein;
   the membrane has a collar region encompassing the central region and the collar region is formed in one part with the central region, and
   the collar region is fixedly connected at its outer periphery to the annular member and/or to the bearing spring member; and
   the membrane is configured in a disk shape and the membrane is movable in the axial direction with respect to the annular member, and wherein the central region and the collar region together form the membrane, the central region and a portion of the collar region together being able to rise from the annular member in the axial direction (x).

2. The hydraulically damping assembly bearing in accordance with claim 1, wherein the inner wall has at least one bulge, the inner space having an axial center axis, the at least one bulge extending about the axial center axis.

3. A hydraulically damping assembly bearing in accordance with claim 2, wherein the inner wall has at least one dimple axially adjoining the at least bulge, the at least one dimple extending about the axial center axis.

4. A hydraulically damping assembly bearing in accordance with claim 1, wherein the membrane has at least one stiffening element arranged at a side of the membrane, the side of the membrane facing the inner space, the stiffening element being configured to increase the stiffness of the membrane.

5. A hydraulically damping assembly bearing in accordance with claim 1, wherein the inner space comprises a side, the side being open toward an environment, and the side being remote from the membrane.

6. A hydraulically damping assembly bearing in accordance with claim 1, wherein the membrane is vibration capable in the axial direction relative to the annular member.

7. A hydraulically damping assembly bearing in accordance with claim 1, wherein the annular member has two ring-shaped annular member parts, the two ring-shaped annular member parts being arranged axially above one another, and the collar region is fixed at its outer periphery between the two ring-shaped annular member parts.

8. A hydraulically damping assembly bearing in accordance with claim 7, wherein the annular member has a recess at a side remote from the working chamber, the axial passage aperture opening into the recess.

9. A hydraulically damping assembly bearing in accordance with claim 8, wherein the recess is provided in an annular member part of the annular member parts, the annular member part being remote from the working chamber.

10. A hydraulically damping assembly bearing in accordance with claim 1, wherein the at least one channel is provided in the annular member.

11. A hydraulically damping assembly bearing in accordance with claim 1, wherein the bearing spring member has an elastomeric bearing spring and two connector parts of stable shape that are fixedly connected to the bearing spring member, with the bearing spring extending in the axial direction between the two connector parts of stable shape.

12. A hydraulically damping assembly bearing in accordance with claim 8, wherein the membrane is disposed in the recess.

13. A hydraulically damping assembly bearing in accordance with claim 1, wherein the central region and the collar region are arranged at a side of the axial passage aperture remote from the working chamber.

* * * * *